United States Patent [19]

Alcorn

[11] 4,102,591
[45] Jul. 25, 1978

[54] CUTTING TOOL

[75] Inventor: Arnold B. Alcorn, Wooster, Ohio

[73] Assignee: The Warner & Swasey Company, Cleveland, Ohio

[21] Appl. No.: 755,734

[22] Filed: Dec. 30, 1976

[51] Int. Cl.² .............................................. B26D 1/00
[52] U.S. Cl. .................................. 407/100; 407/108; 407/115; 408/197; 408/239 R
[58] Field of Search ............... 408/197, 231, 233, 239; 29/96, 95 R

[56] References Cited

U.S. PATENT DOCUMENTS

| | | | |
|---|---|---|---|
| 2,924,129 | 2/1960 | Munro | 408/187 |
| 3,002,405 | 10/1961 | Heftler | 408/197 |
| 3,245,288 | 4/1966 | Fried | 29/96 |
| 3,754,309 | 8/1973 | Jones et al. | 29/96 |

*Primary Examiner*—Leonidas Vlachos

[57] ABSTRACT

An improved cutting tool includes a tool holder having a recess in which an insert is held by a retaining screw. The retaining screw has a head end portion which extends into an open recess formed in a side of the insert to press the insert against bottom and side surfaces of the tool holder recess. To maximize the length of a threaded opening engaged by the retaining screw, the screw has a central axis which extends at an acute angle to a central axis of the tool holder. The bottom and side surfaces of the tool holder recess extend at acute angles to the central axis of the tool holder to firmly support the insert during a cutting operation. An outer end portion of a shank of the tool holder has a generally oval cross-sectional configuration which provides clearance for chips cut from a workpiece and also provides a relatively strong support for the insert. In addition, the oval cross-sectional configuration of the tool holder shank enables the insert to be utilized to form relatively deep grooves on the inside of a workpiece. The insert has a generally rectangular body which is received in the tool holder recess and a cantilevered cutting portion which extends outwardly from the insert body. The cutting portion has at least one cutting edge which is disposed in a plane containing the longitudinal central axis of the tool holder. A face surface on the cutting portion of the insert extends away from the cutting edge in a direction transverse to top and bottom surfaces of the body of the insert and to the bottom surface of the tool holder recess in which the insert is received.

48 Claims, 13 Drawing Figures

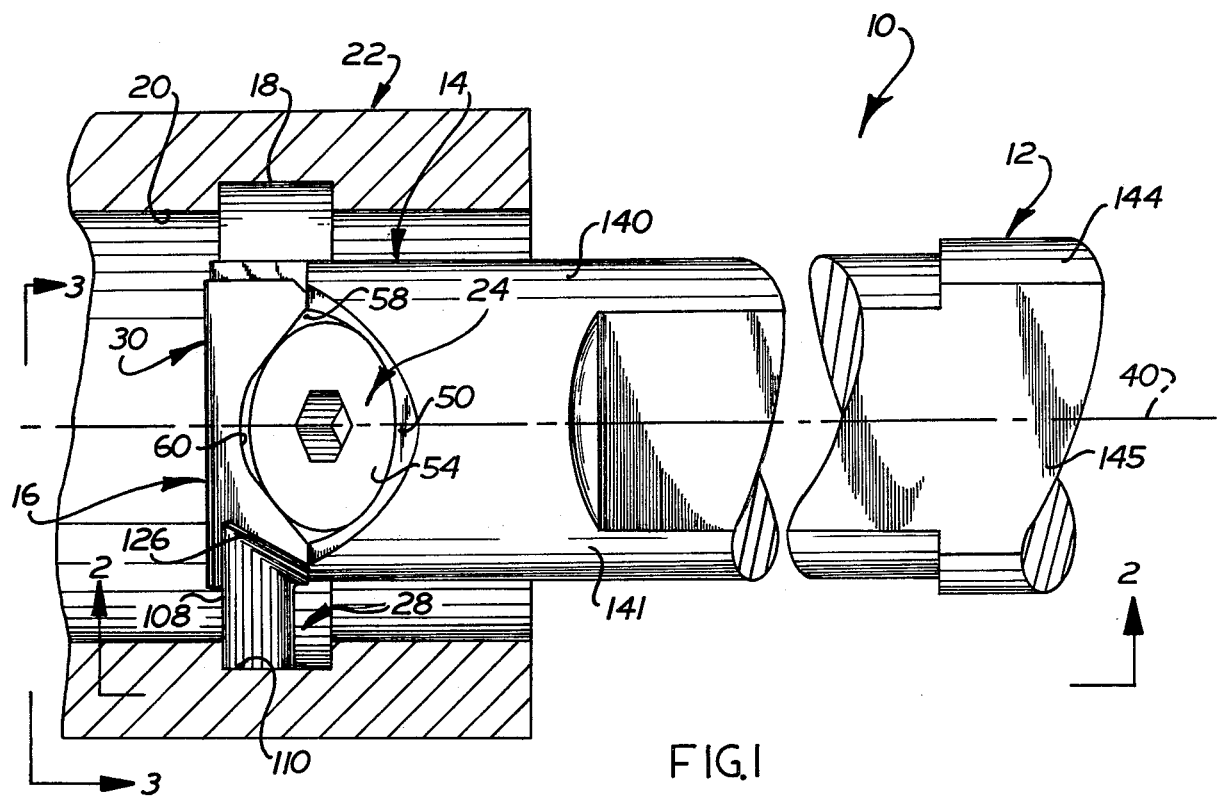
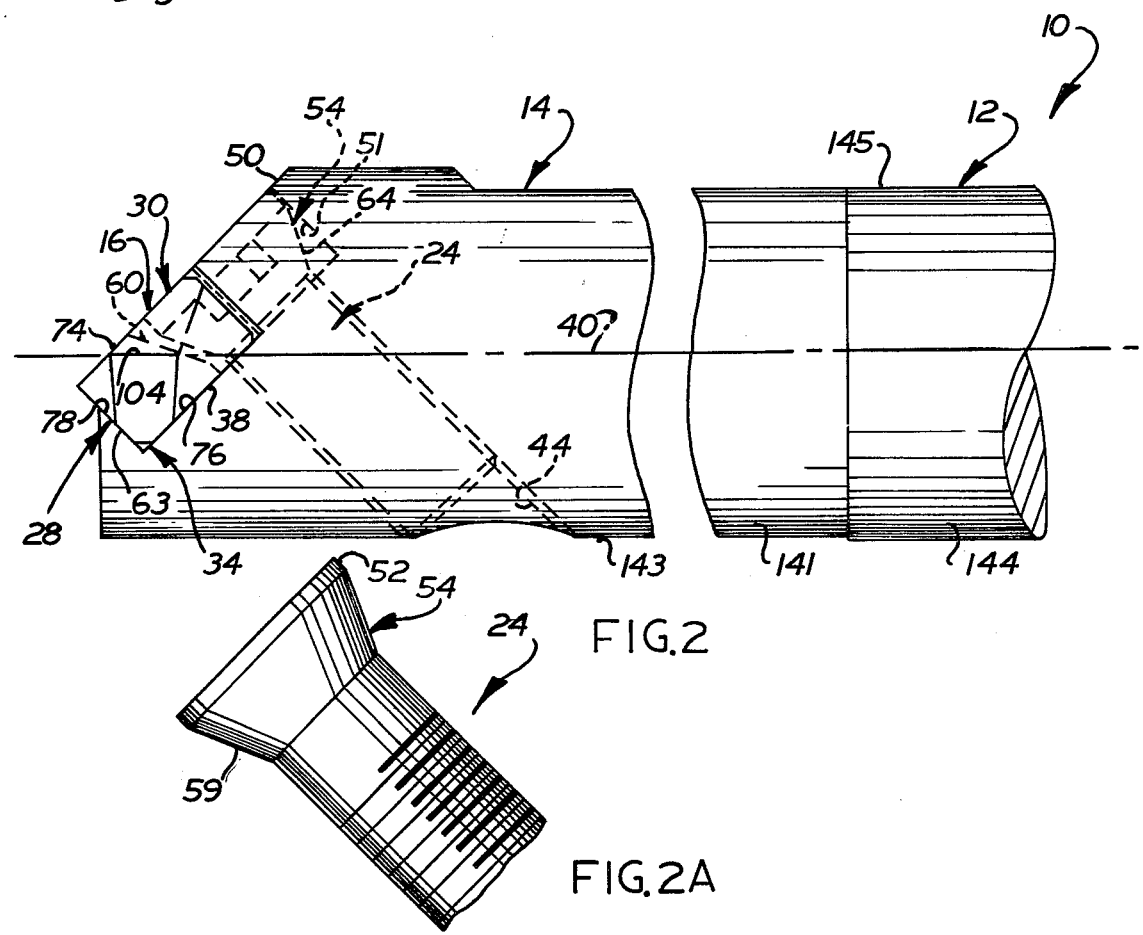
FIG.1
FIG.2
FIG.2A 4,102,591

CUTTING TOOL

BACKGROUND OF THE INVENTION

This invention relates generally to a device for use in cutting material from an opening formed in a workpiece and more specifically to an improved tool holder and to an improved tool holder insert.

Cutting tools commonly include tool holders upon which replaceable bits or inserts having cutting edges are mounted. Various types of known cutting tools are disclosed in U. S. Pat. Nos. 646,967; 3,254,392; 3,566,495; 3,686,729 and 3,986,237. At least some of the cutting devices disclosed in these and other prior art patents and publications can be utilized to cut metal from within an opening in a workpiece as the workpiece is being rotated.

SUMMARY OF THE PRESENT INVENTION

The present invention provides a new and improved device which is utilized to cut metal from within an opening in a workpiece. In accordance with one aspect of the invention. an improved tool holder is provided to support a cutting bit or insert. The tool holder has a recess in its outer end portion which receives the insert.

In accordance with another feature of the invention, the insert has an improved construction and includes a generally rectangular body with an open side recess into which a head end portion of a fastener extends to apply pressure against a sloping side surface. This pressure urges a bottom surface of the insert body into tight abutting engagement with a bottom surface of the tool holder recess. The pressure against the sloping side of the insert recess also presses a side surface of the insert firmly against a side surface of the tool holder recess.

The improved insert is provided with a cantilevered cutting portion which extends outwardly from one end of the body of the insert. The cutting portion is relatively small and projects sidewardly from the tool holder to enable the cutting portion to be utilized to cut metal from within an opening in a workpiece. The cutting portion has a face surface which extends between the cutting edge and the end of the insert body in a direction parallel to the central axis of the tool holder and transverse to the top and bottom surfaces of the insert body.

It is contemplated that the cutting portion of the insert may have many different configurations to enable it to be utilized for different cutting operations. Thus, in one embodiment of the invention the cutting portion has side and end cutting edges which extend perpendicular to each other to enable the cutting portion to be utilized to form an internal groove having a rectangular cross-sectional configuration. In another embodiment of the invention the side cutting edge has a positive rake to enable the cutting portion to be used to perform an internal boring operation. In still another embodiment of the invention the cutting portion is provided with a pair of cutting edges which intersect at an acute angle to enable the insert to be utilized in an internal thread forming operation.

Accordingly, it is an object of this invention to provide a new and improved metal cutting device which includes a tool holder and an insert which is received in a recess in the outer end portion of the tool holder and wherein a fastener has a head end portion which extends into a recess in a side of the insert to press a bottom surface of the insert against a bottom surface of the tool holder recess and to press a side surface of the insert against a side surface of the tool holder recess.

Another object of this invention is to provide a new and improved device to cut metal from a workpiece and wherein the device includes an insert having a body which is received in a recess in a tool holder and a relatively small cutting portion which extends outwardly from the insert body and has an edge to cut metal from the workpiece.

BRIEF DESCRIPTION OF THE DRAWINGS

The foregoing and other objects and features of the present invention will become more apparent upon a consideration of the following description taken in connection with the accompanying drawings wherein:

FIG. 1 is a fragmentary sectional view illustrating the manner in which a cutting tool constructed in accordance with the present invention can be utilized to form a groove within a workpiece;

FIG. 2 is a side elevational view, taken generally along the line 2—2 of FIG. 1, illustrating the manner in which an insert is held in a recess in an outer end portion of a tool holder by a retaining screw;

FIG. 2A is a fragmentary side view of the screw illustrated in FIG. 2;

DESCRIPTION OF SPECIFIC PREFERRED EMBODIMENTS OF THE INVENTION

Figure 3:
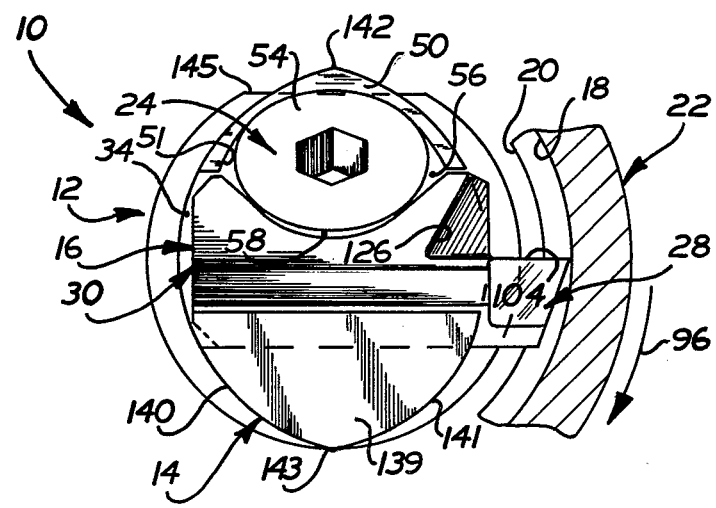
FIG. 3 is an end view, taken generally along the line 3—3 of FIG. 1, further illustrating the manner in which a cutting edge on the insert removes metal from within an opening formed in the workpiece.

A cutting tool 10 constructed in accordance with the present invention is illustrated in FIGS. 1 and 2 and includes a longitudinally extending tool holder 12 with an outer end portion 14 on which a carbide cutting bit or insert 16 is mounted. The insert 16 is effective to form a groove 18 (FIGS. 1 and 3) in a cylindrical opening 20 formed in a rotating workpiece 22. The insert 16 is held against movement relative to the tool holder 12 during a cutting operation by a fastener or retaining screw 24.

In accordance with a feature of the present invention, the insert 16 has a relatively small cantilevered cutting portion 28 which extends outwardly from and is integrally formed with a generally rectangular body portion 30 (see FIGS. 6-10). The body portion 30 of the insert 16 is received in a recess 34 (FIGS. 2-5) formed in the outer end portion 14 of the tool holder 12. The recess 34 (FIGS. 4 and 5) has a flat bottom surface 38 which extends at an acute angle to a longitudinal central axis 40 (FIG. 2) of the tool holder 12. Although the flat bottom surface 38 of the recess could extend at many different angles relative to the longitudinal central axis 40 of the tool holder, in the illustrated embodiment of the invention the bottom surface 38 of the recess extends at an angle of approximately 45° to the central axis 40 of the tool holder.

The bottom surface 38 of the tool holder recess 34 is intersected by a threaded opening 44 (see FIG. 2) having a central axis which extends perpendicular to the flat bottom surface of the recess and intersects the longitudinal central axis 40 of the tool holder 12. The recess 34 is provided with a generally rectangular main section 46 (FIGS. 4 and 5) and an arcuate side section 48. The side section 48 is enclosed by a longitudinally projecting end wall 50 which extends perpendicular to the bottom surface 38 and forms an aligning surface for a head or outer end 54 of the retaining screw 24 (see FIGS. 2 and 3). The end wall 50 has an arcuate surface 51 (see FIGS. 2-4) which abuttingly engages the head 54 of the screw 24 to prevent deflection of the screw. Thus, the screw head 54 has a cylindrical outer side surface 52 (FIG. 2A) which has the same curvature as the end wall surface 51 and abuttingly engages the end wall surface.

The retaining screw 24 is effective to press the insert 16 against the lower inside corner of the recess 38 to firmly hold the insert against movement relative to the tool holder 12. Thus, the head end 54 of the retaining screw 24 extends through an open mouth 56 of a recess 58 (FIG. 7) formed in one side of the insert 16. The sloping side surface 60 extends at an acute angle to the bottom surface 38 and side surface 63 of the tool holder recess 34 (FIG. 2). The flat bottom surface 38 and side surface 63 of the tool holder recess 34 extend perpendicular to each other to form a lower inside corner of the recess 34. Since the sloping side surface 60 of the insert recess 58 is directly opposite from the corner formed by the bottom surface 38 and side surface 63 of the tool holder recess 34, the pressure applied against the sloping side surface 60 of the insert recess 58 by the head end 54 of the retaining screw 24 has a force component directed toward the side surface 63 and a force component directed toward the bottom surface 38 of the tool holder recess 34. These force components are effective to firmly press the insert 16 into the corner of the tool holder recess.

The conical surface 59 of the head end 54 of the screw 24 (see FIG. 2A) engages opposite side sections 66 and 68 (FIG. 7) at areas 66a and 68a on the sloping surface 60. The radius of curvature of an arcuate center or bight portion 72 of the recess 58 is such that the arcuately curved surface 64 of the screw 24 engages only the two side areas 66a and 68a of the surface 60 and is spaced apart from the interconnecting or bight section 72. The surface 60 slopes downwardly from a flat top surface 74 of the insert body 30 to a flat bottom surface 76 (see FIG. 9) of the insert body in a direction away from an opposing side surface 78 (see FIG. 6) of the insert body. The top and bottom surfaces 74 and 76 of the insert 16 extend parallel to each other. The side surface 78 of the insert body 30 extends parallel to an opposite side surface 86 and perpendicular to the top surface 74 and bottom surface 76.

The insert 16 is held against movement relative to the end of the tool holder 12 by engagement of bottom and side surfaces 76 and 78 of the insert body 30 with bottom and side surfaces 38 and 63 of the tool holder recess 34. The flat bottom and side surfaces 38 and 63 of the insert 16 are pressed against the flat bottom and side surfaces 38 and 63 of the tool holder recess 34. During a cutting operation, forces applied against the cutting end portion 28 of the insert 16 due to rotation of the workpiece 22 in the direction of the arrow 96 in FIG. 3, causes the insert 16 to be firmly pressed against the bottom and side surfaces 38 and 63 of the tool holder recess. Engagement of the head end portion 54 of the screw 24 with the surface areas 66a and 68a retains the insert in firm engagement with the bottom and side surfaces 38 and 63 of the tool holder recess 34.

Figure 4:
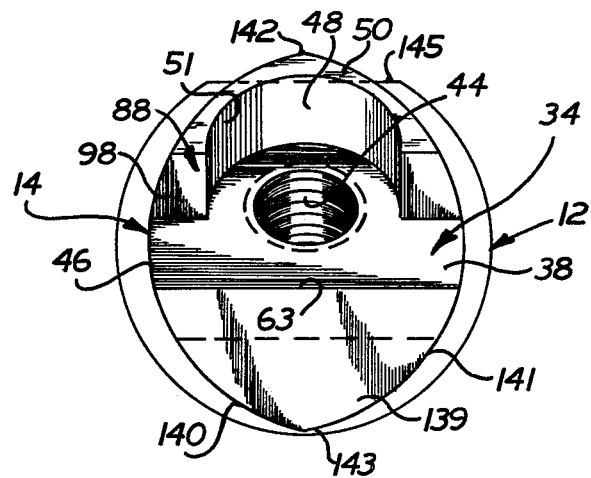
FIG. 4 is an end view of the tool holder of FIG. 1 with the insert and its retaining screw removed to illustrate the construction of a tool holder in which the insert is received.
Figure 5:
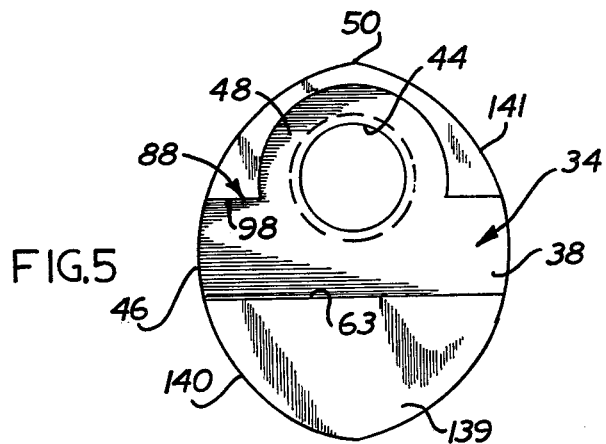
FIG. 5 is a plan view of the tool holder recess of FIG. 4.

It should be noted that the side surfaces 63 and 88 of the tool holder recess 34 extend perpendicular to the bottom surface 38 of the recess (see FIGS. 4 and 5). Similarly, the side surfaces 78 and 86 of the insert body 30 extend perpendicular to the top and bottom surfaces 74 and 76 of the insert body 30. The insert body 30 also has a pair of parallel end portions 100 and 102 which extend perpendicular to the top and bottom surfaces 74 and 76 and perpendicular to the side surfaces 78 and 86.

The relatively small cutting portion 28 of the solid carbide insert 16 is integrally formed with the relatively large rectangular body 30 of the insert. The insert body 30 supports only the inner end of the cutting portion 28 so that the cutting portion 28 has cantilevered construction (FIGS. 1 and 3). This cantilevered construction enables the free or unsupported outer end of the cutting portion 28 to engage the inside of the workpiece 22 in the manner shown in FIG. 3.

The cutting portion 28 has a flat face surface 104 which is disposed in a plane containing the longitudinal central axis 40 of the tool holder 12 (see FIG. 2) when the insert 16 is clamped in place by the screw 24. The insert 16 is of the type utilized to form a groove 18 in the workpiece 22 and includes an end cutting edge 108 (see FIG. 8) at a leading side of the face surface 104 and a side cutting edge 110 which extends perpendicular to the end cutting edge 108 and is located at an outermost end of the face surface 104. A trailing edge 112 of the face surface 104 is disposed opposite from the end cutting edge 108 and extends parallel to the end cutting edge and perpendicular to the side cutting edge 110. The face surface 104 has a maximum width between edges 108 and 112 which is less than the distance between the side surfaces 78 and 86 of the body 30. The face surface 104 has a maximum length between the body 30 and the edge 110 which is less than the distance between the end portions 100 and 102 of the body 30.

A pair of parallel corners 114 and 116 (see FIG. 6) are formed on opposite sides of the cutting face 104. The corner 114 is formed at the intersection of a flat side surface 118 (FIGS. 6 and 7) and the face surface 104. The corner 114 intersects the body 30 adjacent to the top surface 74 of the insert body. The corner 116 is formed at the intersection of a flat side surface 120 (FIGS. 6 and 9) and the face surface 104. The corner 116 intersects the insert body 30 at a location intermediate the top and bottom surfaces 74 and 76. The side surfaces 118 and 120 slope slightly toward each other so that the angle between the side surfaces 118 and 120 and the face surface 104 is somewhat less than 90°.

A third or outer corner 124 extends perpendicular to the two corners 114 and 116. The corner 124 is formed at the intersection of a flat end surface 126 and the face surface 104 (see FIGS. 6 and 10). The corner 124 extends between the two corners 114 and 116. The corners 114 and 116 are parallel to each other and extend from the side cutting edge 110 to the end portion 100 of the insert body 30.

The face surface 104 of the cutting portion 28 extends perpendicular to the surface of the workpiece 22 where the cutting edges 108 and 110 engage the workpiece. In addition, the face surface 104 is disposed in a plane containing the axis of rotation of the workpiece 22. Therefore, the face surface 104 extends at an acute angle to the top surface 74 and bottom surface 76 of the insert body 30. Although the acute angle between the surface 104 and the top and bottom surfaces 76 and 78 of the insert body could be many different magnitudes, in the illustrated embodiment of the invention the face surface 104 extends at a 45° angle to both the top and bottom surfaces 76 and 78.

The face surface 104 of the cutting portion 28 intersects a surface 126 (FIG. 8) formed on the insert body 30 at a location disposed inwardly from the end portion 100 of the insert body. By extending the face surface 104 into the insert body 30, a space is provided for chips cut from the workpiece during a cutting operation. It should be noted that the sloping surface 126 is angled relative to the central axis 40 of the tool holder 12 so as to direct the chips toward the leading end of the tool holder 12 (see FIG. 1) where there is adequate space for the chips to fall away from the cutting area.

Since the face surface 104 is disposed in a plane which contains the central axis 40 of the tool holder 12, the cutting edges 108 and 110 are both disposed in a plane containing the central axis 40 of the tool holder 12. When the cutting edge 108 is to be sharpened, metal is ground away from the side surface 118. Similarly, when the cutting edge 110 is to be sharpened, metal is ground away from the end surface 126. This enables the cutting edges of the insert 16 to be sharpened without displacing the cutting edges from a plane containing the central axis 40 of the tool holder 14.

Figure 10:
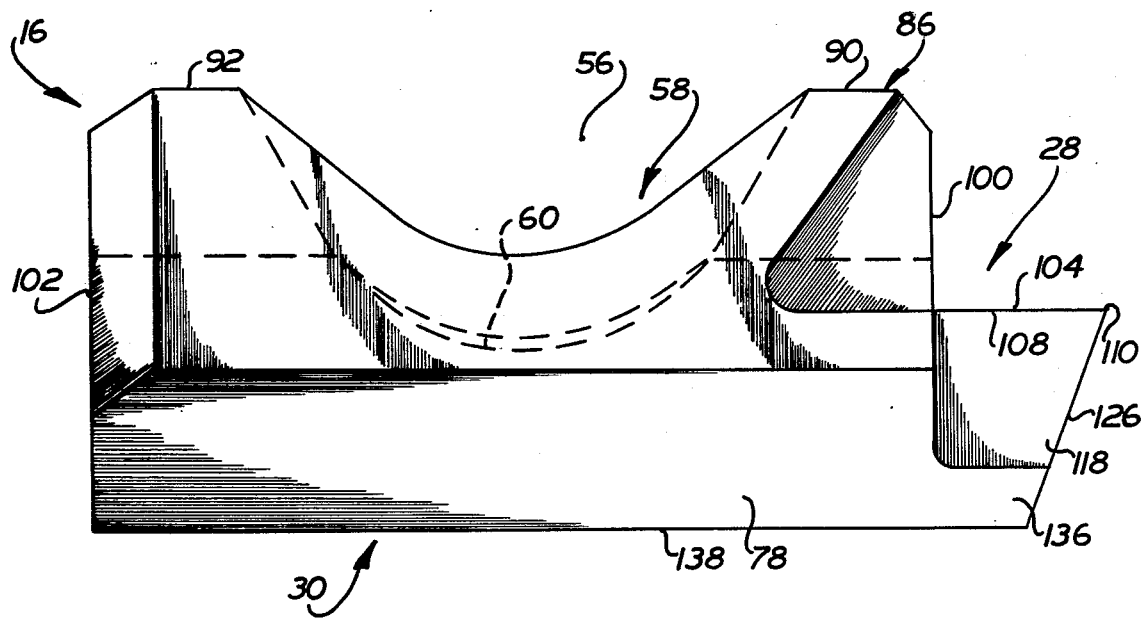
FIG. 10 is a side elevational view, taken generally along the line 10—10 of FIG. 6, further illustrating the construction of the insert.

The cutting portion 28 extends outwardly from the body portion 30 and has a pair of bottom side surfaces 134 and 136 (FIG. 6) which extend perpendicular to each other and are a continuation of the bottom surface 76 and side surface 78 of the insert body 30. Thus, the side surface 78 of the insert body is continued outwardly to form the bottom side surface 136 of the cutting portion 28 as a continuation of the insert body (FIG. 10). Similarly, the bottom side surface 134 forms a continuation of the bottom surface 76 of the insert body 30.

A flat bottom surface 138 (FIGS. 6 and 10) extend throughout the length of the cutting portion 28 and the insert body 30. The flat bottom surface 138 intersects the bottom surface 76 and side surface 78 of the insert body 30 and the two bottom side surfaces 134 and 136 of the cutting portion 28. By providing the bottom surface 138, the insert 16 does not have a sharp corner where the insert engages the bottom surface 38 and side surface 63 of the tool holder recess 34. Therefore, if the bottom surface 38 and side surface 63 of the recess 34 are not disposed at exactly the same angle as the bottom surface 76 and side surface 78 of the insert body 30, the bottom and side surfaces of the insert body can still engage the bottom and side surfaces of the recess without having line contact which could occur in the absence of the flat bottom surface 138.

To enable the insert 16 to be used to cut relatively deep grooves, to allow chips cut from inside of the workpiece to move away from the cutting area and to provide a relatively strong support for the insert 16, the outer end portion 14 of the tool holder 12 has a greater vertical height (as viewed in FIG. 3) than horizontal width. The relatively large vertical height of the outer end portion 14 of the tool holder provides a substantial body of metal in a support wall 139 (FIG. 3) disposed directly beneath the insert 16 to withstand the downward forces transmitted from the insert to the tool holder. In order to facilitate movement of chips away from the cutting area where the groove 18 is being formed, the outer end portion 14 of the tool holder 12 is provided with a pair of arcuate side surfaces 140 and 141 which intersect at upper and lower peaks 142 and 143.

In order to provide for the reduced horizontal width of the outer end portion 14 of the tool holder so that the extent to which the cutting portion 28 projects outwardly is maximized, the arcuate side surfaces 140 and 141 form portions of circles having centers which are offset from the longitudinal central axis 40 of the tool holder 10. Thus, the center for the arcuate side surface 140 is offset to the right (as viewed in FIG. 3) of the central axis of the tool holder while the arcuate surface 141 has a center which is offset to the left (as viewed in FIG. 3) of the central axis of the tool holder.

Since the arcuate surfaces 140 and 141 are spaced apart by a relatively small horizontal distance (as viewed in FIGS. 3 and 4), the chips cut from the workpiece 22 can pass between the end portion 14 of the tool holder 10 and the workpiece without becoming trapped between the tool holder and the workpiece. The relatively small width of the end portion 14 of the tool holder 10 enables the cutting portion 28 to project outwardly for a relatively large distance to form relatively deep grooves. In addition to providing a relatively small width, the arcuate surfaces 140 and 141 provide a relatively large height or vertical dimension for the end portion of the tool holder. This relatively large height or vertical dimension is necessary in order to provide adequate support for the insert 16. Thus, the insert support wall 139 has a greater thickness than it would have if the end portion 14 had been formed with a circular cross-sectional configuration with a diameter equal to the horizontal distance through the center of the tool holder between the arcuate surfaces 140 and 141.

The tool holder 12 is provided with a cylindrical base portion 144 which engages a suitable support arrangement. The base portion 144 and the outer end portion 14 of the tool holder 12 are provided with a flat upper (as viewed in FIGS. 2, 3 and 4) surface 145. The surface is engaged by set screws to hold the tool holder 12 against movement relative to its support.

Figure 11:
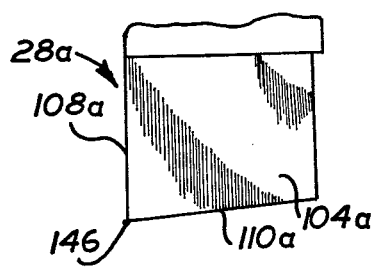
FIG. 11 (on sheet 3 of the drawings) is a fragmentary view, generally similar to FIG. 8, illustrating the construction of a cutting portion of an embodiment of the insert adapted to perform a boring operation, and FIG. 12 (on sheet 3 of the drawings) is a fragmentary view, generally similar to FIG. 11, of an embodiment of the insert which is adapted to form a thread.
Figure 12:
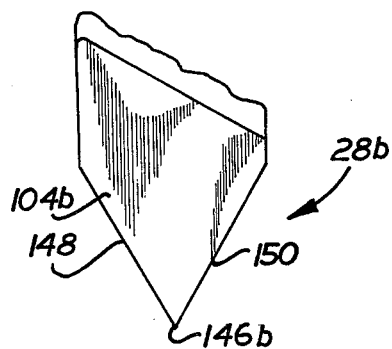
Figure 6:
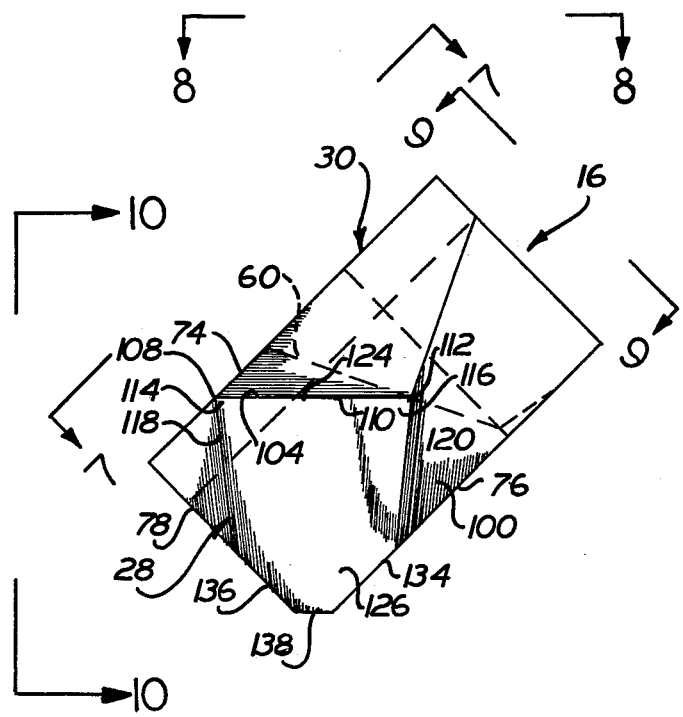
FIG. 6 is an enlarged end view of the insert of FIG. 2 disconnected from the tool holder.
Figure 7:
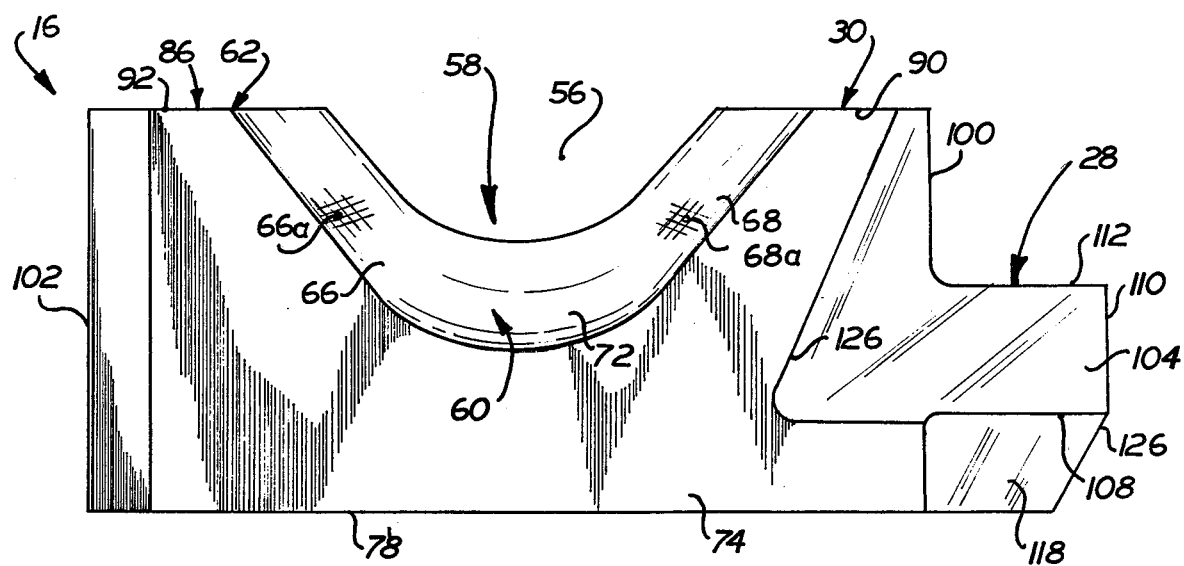
FIG. 7 is a view taken parallel to a top surface of the insert along the line 7—7 of FIG. 6.
Figure 8:
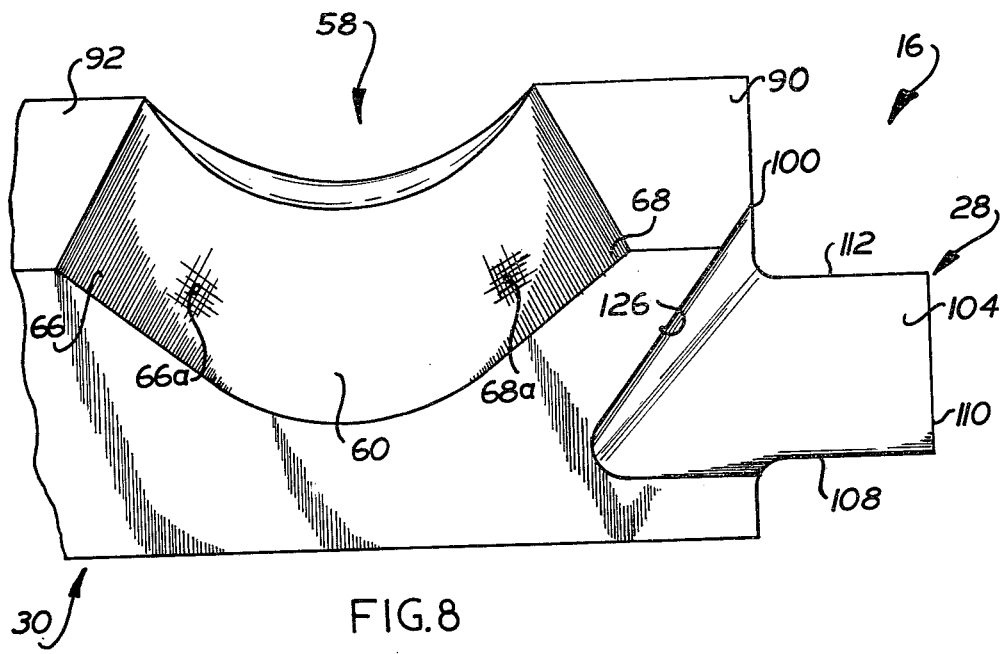
FIG. 8 is a top plan view, taken generally along the line 8—8 of FIG. 6 and further illustrating the construction of the insert.
Figure 9:
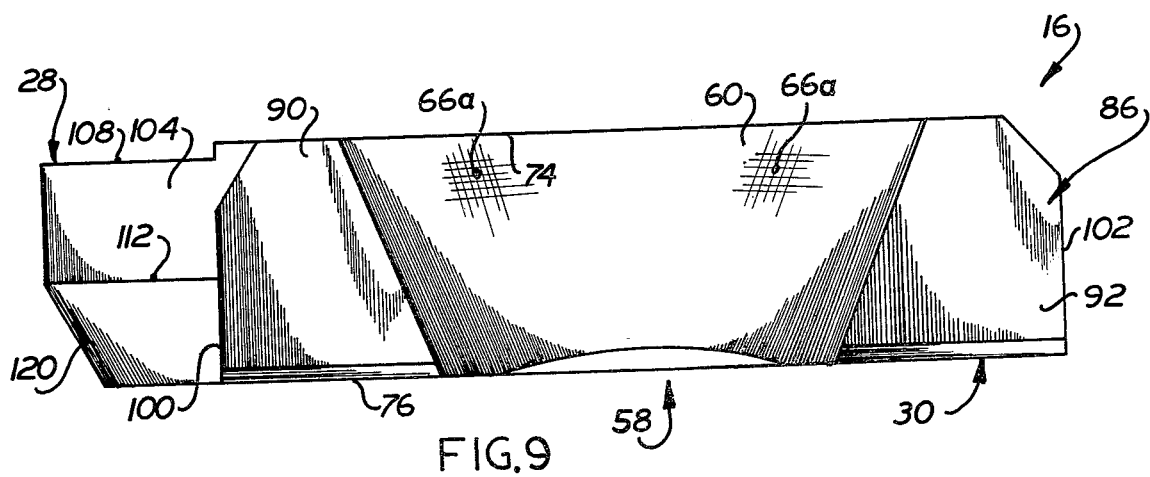
FIG. 9 is a view taken parallel to a side surface of the insert along the line 9—9 of FIG. 6.

In the embodiment of the invention illustrated in FIGS. 1–10, the insert 16 is adapted to form a groove inside the opening 20 in the workpiece 22. However, it is contemplated that the insert could be adapted for either a boring operation in which a cylindrical inner surface of the opening 20 is cut away or a threading operation in which threads are formed inside the opening 20. Accordingly, in the embodiments of the invention illustrated in FIGS. 11 and 12, the insert has been shown with cutting portions which have been shaped to perform either a boring operation (FIG. 11) or a threading operation (FIG. 12). Since the components of the embodiments of the invention shown in FIGS. 11 and 12 are similar to the components of the embodiments of the invention shown in FIGS. 1-10, similar numerals will be utilized to designate similar components, the suffix letter "a" being associated with FIG. 11 and the suffix letter "b" being associated with the numerals of FIG. 12 to avoid confusion.

The cutting portion 28a (FIG. 11) of a boring tool is provided with an end cutting edge 108a at a leading side of a face surface 104a. The face surface 104a, like the face surface 104 of the embodiment of the invention illustrated in FIG. 2, is disposed in the same plane as the central axis of the associated tool holder. However, it could be provided with a positive radial and axial rake if desired. Since the cutting portion 28a is adapted to form a boring operation, the side cutting edge 110a does not extend perpendicular to the end cutting edge 108a but rather has an end cutting edge angle so that the angle between the side cutting edge 110a and the end cutting edge 108a is less than 90°. This enables the cutting portion 28 to cut away material with only a nose 146 formed at the intersection of the side and end cutting edges 108a and 110a to enlarge a cylindrical opening in a workpiece in a well known manner.

A cutting portion 28b (FIG. 12) of a threading tool is provided with a pair of side cutting edges 148 and 150 which extend at an acute angle which is the same as a thread flank angle. The side cutting edges 148 and 150 are disposed on opposite sides of a face surface 104b. The face surface 104b is disposed in a plane containing the longitudinal central axis of an associated tool holder. The two side cutting edges 148 and 150 intersect at a nose portion 146b. In forming a thread on the inside of an opening in a workpiece, it is contemplated that the cutting portion 28b of the insert will be repetitively moved along the thread until the thread has been formed to the desired depth. During this repetitive movement of the insert, the side cutting edges 148, 150 form the flanks of an internal thread convolution.

In view of the foregoing description, it can be seen that the present invention provides a new and improved tool holder 12 which is utilized to support an improved cutting bit or insert 16. The tool holder 12 has a recess 34 in its outer end which receives the insert 16. In accordance with another feature of the present invention, the insert 16 has an open side recess 58 into which the head end portion 54 of a retaining screw or fastener 24 extends to apply pressure against a sloping side surface 60 of the recess. This pressure urges a bottom surface 76 of the body portion 30 of the insert 16 into tight abutting engagement with a bottom surface 38 of the recess 34 in the tool holder 12 and presses a side surface 78 of the insert 16 firmly against a side surface 63 of the recess in the tool holder. The head end portion 54 of the retaining screw is advantageously supported by engagement with the circular surface 51 of the tool holder wall 50.

The insert 16 is provided with a body portion 30 having parallel top and bottom surfaces 74 and 76. A cantilevered cutting portion 28 extends outwardly from one end 100 of the body 30 of the insert. The cutting portion 28 has a relatively small maximum width, that is a maximum width which is less than the width of the top surface 74 and projects outwardly from the end of the insert for a distance which is less than the length of the body 30. A face surface 104 of the cutting portion extends at an acute angle to the top and bottom surfaces 74 and 76 of the insert body 30.

It is contemplated that the cutting portion of the insert may have different configurations to enable it to be utilized to perform different cutting operations. Thus, in the embodiment of the invention illustrated in FIGS. 1-10, the cutting portion 16 has end and side cutting edges 108 and 110 which extend perpendicular to each other to enable the cutting portion to be utilized to form a groove having a rectangular cross-sectional configuration. In the embodiment of the invention illustrated in FIG. 11, the side cutting edge 110a has a positive rake to enable the cutting portion 28a to be used to perform a boring operation. In the embodiment of the invention illustrated in FIG. 12, the cutting portion 28b is provided with a pair of side cutting edges 148 and 150 which intersect at an acute angle to enable the insert to be used in a thread forming operation.

Having described one specific preferred embodiment of the invention, the following is claimed:

1. A device for use in cutting material from within an opening formed in workpiece, said device comprising a longitudinally extending tool holder having an outer end portion adapted to extend into the opening in the workpiece, said outer end portion of said tool holder including surface means for defining a recess having a bottom surface and a flat planar side surface extending transversely to said bottom surface, said recess having at least one open end located at one end of said flat planar side surface, said outer end portion of said tool holder further including surface means for defining a threaded opening which extends transversely to said bottom surface of said recess, an insert adapted to be received in said recess in said outer end portion of said tool holder and having a cutting portion engageable with the workpiece, said insert having a top surface, a bottom surface opposite from said top surface and adapted to abuttingly engage the bottom surface of said recess, a first side portion interconnecting said top and bottom surfaces of said insert, said first side portion having a flat planar surface area adapted to abuttingly engage the flat planar side surface of said recess, a second side portion interconnecting said top and bottom surfaces of said insert and disposed opposite from said first side portion, said second side portion of said insert including side surface means for defining a recess intersecting said top surface and having an open side facing outwardly in a direction away from said first side portion of said insert, said side surface means sloping away from said top surface of said insert in a direction away from said first side portion of said insert, and a pair of opposite end portions interconnecting said top and bottom surfaces and disposed at opposite ends of said side portions, said end portions of said body being at least slightly smaller than said open end of said recess in said tool holder to enable said insert to be moved in said recess in said tool holder along a path extending parallel to said flat side surface, and screw means for holding said insert against movement in said recess in said tool holder along said path, for pressing said bottom surface of said insert against said bottom surface of said recess in a tool holder and for pressing said flat planar surface area of said first side portion of said insert against said flat planar side surface of said recess in said tool holder, said screw means including a shank portion disposed in engagement with said threaded opening in said tool holder and a head end portion, said head end portion of said screw means extending through the open side of said recess in said insert into engagement with said side surface means to apply against said side surface means force having a component directed toward said bottom surface of said recess in said tool holder and another component directed toward said flat planar side surface of said recess in said tool holder.

2. A device as set forth in claim 1 wherein said cutting portion of said insert includes a corner formed by the intersection of at least two surfaces on said insert, a first one of said surfaces forming said corner being disposed in a plane containing the longitudinal central axis of said tool holder to enable said insert to be sharpened by removing material from the insert in the area of the other one of the two surfaces forming said corner while maintaining said first surface in the plane containing the longitudinal central axis of said tool holder.

3. A device as set forth in claim 1 wherein said bottom and side surfaces of said recess in said tool holder extend transversely to the longitudinal central axis of said tool holder.

4. A device as set forth in claim 1 wherein said side surface means of said insert includes a pair of side sections diverging outwardly from and interconnected by an arcuate inner section, said head end portion of said screw means being disposed in abutting engagement with said pair of side sections of said side surface means.

5. A device as set forth in claim 1 wherein said threaded opening in said tool holder has a central axis which is disposed outwardly of the open side of said recess in said insert when said bottom surface and first side portion of said insert are disposed in engagement with said bottom and side surfaces of said recess in said tool holder.

6. A device as set forth in claim 1 wherein said outer end portion of said tool holder includes a first section having a cylindrical outer surface area and a second section disposed outwardly of said first section, said recess in said tool holder being disposed in said second section of said tool holder, said second section having a pair of arcuate outer surfaces with a greater radius of curvature than said first section, said arcuate outer surfaces being disposed in arcuate planes which intersect at the top and bottom of said second section of said tool holder and having arcuately curved side areas disposed inwardly of a cylindrical plane containing said cylindrical surface area of said first section of said tool holder to provide additional space for material cut from the workpiece to pass between the workpiece and the outer end portion of said tool holder.

7. A device as set forth in claim 1 wherein said bottom and side surfaces of said recess in said tool holder extend transversely to the longitudinal central axis of the tool holder and are disposed in planes which intersect at a corner which is disposed below and faces upwardly toward the longitudinal central axis of the tool holder.

8. A device as set forth in claim 7 wherein said threaded opening has a central axis which extends at an acute angle to the longitudinal central axis of the tool holder.

9. A device as set forth in claim 1 wherein said tool holder includes surface means for engaging a portion of said head end portion of said screw means at a location opposite from the open side of said recess in said insert to at least partially support said head end portion of said screw means.

10. A device for use in cutting material from within an opening formed in a workpiece, said device comprising a longitudinally extending tool holder having an outer end portion adapted to extend into the opening in the workpiece, said outer end portion of said tool holder including surface means for defining a recess having a bottom surface and a flat planar side surface extending transversely to said bottom surface, said outer end portion of said tool holder further including surface means for defining a threaded opening which extends transversely to said bottom surface of said recess, an insert adapted to be received in said recess in said outer end portion of said tool holder and having a cutting portion engageable with the workpiece, said insert having a top surface, a bottom surface opposite from said top surface and adapted to abuttingly engage the bottom surface of said recess, a first flat planar side portion extending transversly to said top and bottom surfaces of said insert and adapted to abuttingly engage the flat planar side surface of said recess, and a second side portion opposite from said first side portion, said second side portion of said insert including side surface means for defining a recess intersecting said top surface and having an open side facing outwardly in a direction away from said first side portion of said insert, said side surface means sloping away from said top surface of said insert in a direction away from said first side portion of said insert, and screw means for pressing said bottom surface of said insert against said bottom surface of said recess in said tool holder and for pressing said first side portion of said insert against said side surface of said recess in said tool holder, said screw means including a shank portion disposed in engagement with said threaded opening in said tool holder and a head end portion, said head end portion of said screw means extending through the open side of said recess in said insert into engagement with said side surface means to apply against said side surface means force having a component directed toward said bottom surface of said recess in said tool holder and another component directed toward said flat planar side surface of said recess in said tool holder said threaded opening in said tool holder having a central axis which is disposed outwardly of the open side of said recess in said insert when said bottom surface and first side portion of said insert are disposed in engagement with said bottom and side surfaces of said recess in said tool holder.

11. A device as set forth in claim 10 wherein said threaded opening has a central axis which extends at an acute angle to the longitudinal central axis of the tool holders.

12. A device as set forth in claim 10 wherein said tool holder includes surface means for engaging a portion of said head end portion of said screw means at a location opposite from the open side of said recess in said insert to at least partially support said head end portion of said screw means.

13. A device for use in cutting material from within an opening formed in a workpiece, said device comprising a longitudinally extending tool holder having an outer end portion adapted to extend into the opening in the workpiece, said outer end portion of said tool holder including surface means for defining a recess having a bottom surface and a side surface extending transversely to said bottom surface, said outer end portion of said tool holder includes a first section having a cylindrical outer surface area with a center of curvature which is concident with the longitudinal axis of said tool holder and a second section disposed outwardly of said first section, said recess in said tool holder being disposed in said second section of said tool holder, said second section having a pair of arcuate outer surfaces with centers of curvature which are offset from the longitudinal axis of said tool holder, said arcuate outer surfaces being disposed in arcuate planes which intersect at the top and bottom of said second section of said tool holder and having arcuately curved side areas disposed inwardly of a cylindrical plane containing said cylindrical surface area of said first section of said tool holder to provide additional space for material cut from the workpiece to pass between the workpiece and the outer end portion of said tool holder, said outer end portion of said tool holder further including surface means for defining a threaded opening which extends transversely to said bottom surface of said recess, an insert adapted to be received in said recess in said outer end portion of said tool holder and having a cutting portion engageable with the workpiece, said insert having a top surface, a bottom surface opposite from said top surface and adapted to abuttingly engage the bottom surface of said recess, a first side portion extending transversely to said top and bottom surfaces of said insert and adapted to abuttingly engage the side surface of said recess, and a second side portion opposite from said first side portion, said second side portion of said insert including side surface means for defining a recess intersecting said top surface and having an open side facing outwardly in a direction away from said first side portion of said insert, said side surface means sloping away from said top surface of said insert in a direction away from said first side portion of said insert, and screw means for pressing said bottom surface of said insert against said bottom surface of said recess in said tool holder and for pressing said first side portion of said insert against said side surface of said recess in said tool holder, said screw means including a shank portion disposed in engagement with said threaded opening in said tool holder and a head end portion, said head end portion of said screw means extending through the open side of said recess in said insert into engagement with said side surface means to apply against said side surface means force having a component directed toward said bottom surface of said recess in said tool holder and another component directed toward said side surface of said recess in said tool holder.

14. A device as set forth in claim 13 wherein said bottom and side surfaces of said recess in said tool holder are flat and extend transversely to the longitudinal central axis of the tool holder, said flat bottom and side surfaces being disposed in planes which intersect at a corner which throughout its length is disposed below and faces upwardly toward the longitudinal central axis of the tool holder.

15. A device as set forth in claim 14 wherein said threaded opening has a central axis which extends at an acute angle to the longitudinal central axis of the tool holder.

16. A device for use in cutting material from within an opening formed in a workpiece, said device comprising a longitudinally extending tool holder having an outer end portion adapted to extend into the opening in the workpiece, said outer end portion of said tool holder including surface means for defining a recess having a bottom surface which extends at an acute angle to the longitudinal central axis of said tool holder, said recess in said outer end portion of said tool holder having first and second side surfaces disposed adjacent opposite edges of said bottom surface and extending transversely to said bottom surface and to the longitudinal central axis of said tool holder, said outer end portion of said tool holder further including means for defining an opening having a central axis which extends transversely to said bottom surface of said recess, an insert having a body adapted to be received in said recess in said outer end portion of said tool holder, said insert body having a bottom surface disposed in abutting engagement with said bottom surface of said recess, a top surface spaced apart from said bottom surface, said top and bottom surfaces of said insert body being disposed at acute angles to the longitudinal central axis of said tool holder, said insert body having a first side portion disposed in abutting engagement with said first side surface of said recess in said outer end portion of said tool holder and a second side portion disposed adjacent said second side surface of said recess in said outer end portion of said tool holder, said first and second side portions being disposed on opposite sides of said insert body and extending between said top and bottom surfaces of said insert body, said insert body having first and second end portions interconnecting said top and bottom surfaces of said insert body and disposed at opposite ends of said first and second side portions, said insert further including a cutting portion which is smaller than and integrally formed with said insert body and extends outwardly from said first end portion of said insert body, said cutting portion having a cutting edge adapted to cut metal from the workpiece and a face surface extending from said cutting edge at an acute angle to said top and bottom surfaces of said insert body, said cutting portion extending outwardly from said first end portion of said insert body for a distance which is less than the distance between said first and second end portions of said insert body, said insert body including surface means intersecting said top surface of said insert body and facing toward the central axis of said opening in the outer end portion of said tool holder, and fastener means for pressing said bottom surface of said insert body against said bottom surface of said recess in said tool holder and for pressing said first side portion of said insert against said first side surface of said recess in said tool holder to thereby hold said insert against movement relative to said tool holder under the influence of forces applied to said cutting portion of said insert, said fastener means including a shank portion which is at least partially disposed in said opening in said tool holder and an outer end portion, said outer end portion of said fastener means being disposed in engagement with said surface means to apply against said surface means force having a component directed toward said bottom surface of said recess in said tool holder and another component directed toward said first side surface of said recess in said tool holder.

17. A device as set forth in claim 16 wherein said surface means is part of said second side portion of said insert body and defines a recess having an open side facing toward the central axis of the opening in the outer end portion of said tool holder, said outer end portion of said fastener means extending through the open side of said recess into engagement with said surface means.

18. A device as set forth in claim 16 wherein said face surface is disposed in a plane which contains the longitudinal central axis of said tool holder.

19. A device as set forth in claim 16 wherein said outer end portion of said tool holder includes a first section having a cylindrical outer surface area and a second section disposed outwardly of said first section, said recess in said tool holder being disposed in said second section of said tool holder, said second section having a pair of arcuate outer surfaces with a greater radius of curvature than said first section, said arcuate outer surfaces being disposed in planes which intersect at the top and bottom of said second section of said tool holder and having arcuately curved side areas disposed inwardly of a cylindrical plane containing said cylindrical surface area of said first section of said tool holder to provide additional space for material cut from the workpiece to pass between the workpiece and the outer end portion of said tool holder.

20. A device as set forth in claim 16 wherein said cutting portion has a pair of corners at opposite edges of said face surface, said corners being formed by the intersection of said face surface and opposite side surfaces of said cutting portion, a first one of said pair of corners intersecting said first end portion of said insert body at a location adjacent to said top surface of said insert body, a second one of said pair of corners intersecting said first end portion of said insert body at a location intermediate said top and bottom surfaces of said insert body.

21. A device as set forth in claim 16 wherein said first side portion of said insert body includes a side surface which is disposed in abutting engagement with said first side surface of said recess in said tool holder, said cutting portion including first bottom side surface which is coplanar with said side surface of said first side portion of said insert body and a second bottom side surface which is coplanar with said bottom surface of said insert body, said first and second bottom side surfaces being disposed opposite from and extending transversely to said face surface.

22. A device as set forth in claim 21 wherein said cutting portion further includes a first side surface extending between said first bottom side surface and one edge portion of said face surface and a second side surface extending between said second bottom side surface and a second edge portion of said face surface, said first side surface of said cutting portion cooperating with said face surface to form a first corner which intersects said first end portion at a location adjacent to said top surface of said insert body, said second side surface of said cutting portion cooperating with said face surface to form a second corner which intersects said second end portion at a location intermediate said top and bottom surfaces of said insert body.

23. A device for use in cutting material from within a workpiece, said device comprising an insert having a body adapted to be received in a recess in a tool holder, said body of said insert having a bottom surface adapted to engage a bottom surface of the tool holder recess, a top surface spaced apart from and extending generally parallel to said bottom surface, a pair of opposite side portions interconnecting said top and bottom surfaces, at least one of said side portions being adapted to engage a side of the recess in the tool holder, and a pair of opposite end portions interconnecting said top and bottom surfaces and disposed at opposite ends of said side portions, and a cantilevered cutting portion which is smaller than and integrally formed with said body and extends outwardly from one of said end portions, said cantilevered cutting portion having a cutting edge adapted to cut metal from the workpiece and a face surface extending from said cutting edge and intersecting said body at a location between said opposite side portions, said face surface extending at an acute angle to said top and bottom surfaces of said body, said cantilevered cutting portion extending outwardly from said one of said end portions for a distance which is less than the distance between said opposite end portions, said cantilevered cutting portion having a maximum width measured on said face surface parallel to said one end portion which is less than the distance between said opposite side portions, said cantilevered cutting portion having a pair of bottom surfaces which extend transversely to each other and to said face surface, one of said pair of bottom surfaces on said cantilevered cutting portion being disposed in a coplanar relationship with the bottom surface of said body, the other bottom surface of said pair of bottom surfaces being disposed in a plane which is coplanar with a surface of one of said side portions of said body.

24. A device as set forth in claim 23 wherein said cantilevered cutting portion has a pair of opposite side surfaces, said opposite side surfaces intersecting said face surface to define a pair of opposite corners extending transversely to said one end portion.

25. A device as set forth in claim 24 wherein at least one of said corners intersects said one end portion of said body at a location between planes containing said top and bottom surfaces of said body.

26. A device as set forth in claim 25 wherein one of said side portions includes surface means for defining a recess intersecting said top surface and having an open side facing outwardly in a direction away from the other one of said side portions, said surface means sloping away from the top surface of said body in a direction away from the other one of said side portions.

27. A device for use in cutting material from within a workpiece, said device comprising an insert having a body adapted to be received in a recess in a tool holder, said body of said insert having a bottom surface disposed in a first plane and adapted to engage a bottom surface of the tool holder recess, a top surface disposed in a second plane and spaced apart from said bottom surface, a pair of opposite side portions interconnecting said top and bottom surfaces, at least one of said side portions being adapted to engage a side of the recess in the tool holder, and a pair of opposite end portions interconnecting said top and bottom surfaces and disposed at opposite ends of said side portions, and a cantilevered cutting portion which extends outwardly from one of said end portions, said cutting portion having a cutting edge adapted to cut metal from the workpiece and a face surface extending from said cutting edge and intersecting said body at a location between said opposite side portions, said face surface extending at an acute angle to said top and bottom surface of said body, said cantilevered cutting portion extending outwardly from said one of said end portions for a distance which is less than the distance between said opposite end portions, said face surface being disposed in a third plane which extends transversely to said first and second planes, said third plane intersecting said first plane at a location which is spaced a first distance from one of said side portions, said third plane intersecting said second plane at a location which is spaced a second distance from said one of said side portions, said first distance being different than said second distance.

28. A device as set forth in claim 27 wherein said cantilevered cutting portion has a pair of opposite side surfaces, said side surfaces intersecting said face surface to define a pair of corners, said corner extending transversely to said one end portion.

29. A device as set forth in claim 28 wherein at least one of said corners intersects said one end portion of said body at a location between said first and second planes.

30. A device as set forth in claim 28 wherein one of said corners has an apex which is disposed in said second plane.

31. A device as set forth in claim 27 wherein one of said cantilevered cutting portion has a pair of bottom surfaces which extend transversely to each other and to said face surface.

32. A device as set forth in claim 31 wherein one of said bottom surfaces on said cantilevered cutting portion is disposed in said first plane, the other bottom surface of said pair of bottom surfaces being disposed in a plane which is coplanar with a surface of one of said side portions of said body.

33. A device as set forth in claim 27 wherein one of said side portions includes surface means for defining a recess intersecting said top surface and having an open side facing outwardly in a direction away from the other one of said side portions, said surface means sloping away from the top surface of said body in a direction away from the other one of said side portions, said surface means including a pair of arm portions which diverge outwardly away from the other one of said side portions.

34. A device as set forth in claim 27 wherein said first plane extends parallel to said second plane.

35. A device for use in cutting material from within a workpiece, said device comprising an insert having a body adapted to be received in a recess in a tool holder, said body of said insert having a bottom surface adapted to engage a bottom surface of the tool holder recess, a top surface spaced apart from said bottom surface, first and second opposite side portions interconnecting said top and bottom surfaces, at least said first side portion being adapted to engage a side of the recess in the tool holder, and first and second opposite end portions interconnecting said top and bottom surfaces and disposed at opposite ends of said side portions, and a cantilevered cutting portion extending outwardly from said first end portion, said cutting portion having a cutting edge adapted to cut metal from the workpiece and a face surface extending from said cutting edge and intersecting said body at a location between said first and second side portions, said second side portion including surface means for defining a recess which tapers inwardly from a large open end to a relatively small central bottom portion which is disposed closer to said first side portion of said body than said open end portion of said recess, said surface means including first and second side surface areas which slope away from said top surface toward said bottom surface in a direction away from said first side portion and a central surface area which interconnects said first and second side surface areas and forms said central bottom portion of said recess, said first side surface area extending outwardly away from said central bottom portion to said open end of said recess in a direction toward said first end portion and away from said first side portion, said second side surface area extending outwardly from said central bottom portion to said open end of said recess and diverging away from said first side surface area in a direction toward said second end portion and away from said first side portion.

36. A device as set forth in claim 35 wherein said central surface area has an arcuate line of intersection with said top surface and said first and second side surface areas have straight lines of intersection with said top surface.

37. A device as set forth in claim 35 wherein first and second surface areas are flat.

38. A device as set forth in claim 35 wherein said bottom surface of said body is disposed in a first plane and said top surface of said body is disposed in a second plane, said face surface of said cutting portion being disposed in a third plane which extends transversely to said first and second planes, said third plane intersecting said first plane at a location which is spaced a first distance from said second side portion, said third plane intersecting said second plane at a location which is spaced a second distance from said second side portion, said second distance being greater than said first distance.

39. A device as set forth in claim 35 wherein said first side portion includes a flat surface area, said second side portion including a pair of spaced apart flat surface areas disposed adjacent to opposite sides of said recess.

40. A device for use in cutting material from within a workpiece, said device comprising an insert having a body adapted to be received in a recess in a tool holder, said body of said insert having a bottom surface adapted to engage a bottom surface of the tool holder recess, a top surface spaced apart from said bottom surface, a pair of opposite side portions interconnecting said top and bottom surfaces, at least one of said side portions being adapted to engage a side of the recess in the tool holder, and first and second end portions interconnecting said top and bottom surfaces and disposed at opposite ends of said side portions, said first end portion including an end surface and a chip deflecting surface which slopes away from said end surface toward said second end portion to an intersection with said top surface, said chip deflecting surface extending at an acute angle to said top surface and at an acute angle to said end surface, and a cantilevered cutting portion which is integrally formed with said body and extends outwardly from said first end portion, said cutting portion having a cutting edge adapted to cut metal from the workpiece and a face surface extending from said cutting edge and intersecting said body at a location between said opposite side portions, said face surface intersecting said chip deflecting surface along an intersection which slopes from said end surface toward said second end portion and said top surface.

41. A device as set forth in claim 40 wherein said bottom surface of said body is disposed in a first plane and said top surface of said body is disposed in a second plane, said face surface of said cutting portion being disposed in a third plane which extends transversely to said first and second planes, said third plane intersecting said first plane at a location which is spaced a first distance from said second side portion, said third plane intersecting said second plane at a location which is spaced a second distance from said second side portion, said second distance being greater than said first distance.

42. A device for use in cutting material from within a workpiece, said device comprising an insert having a body adapted to be held in a recess in a tool holder by a fastener, said body of said insert having a bottom surface adapted to engage a bottom surface of the tool holder recess, a top surface spaced apart from said bottom surface, a pair of opposite side portions spaced apart by a distance which is greater than the distance between said top and bottom surfaces and interconnecting said top and bottom surfaces, a first one of said side portions having a flat surface area which is adapted to engage a side of the recess in the tool holder, a second one of said side portions including surface means defining a recess which extends into said body toward said first side portion, said surface means including a pair of side surface areas which diverge outwardly away from each other in a direction away from said first side portion, said side surface areas sloping away from said top surface toward said bottom surface to enable said side surface areas to be engaged by the fastener, and a pair of opposite end portions interconnecting said top and bottom surfaces, said opposite end portions being disposed at opposite ends of said side portions and being spaced apart by a distance which is greater than the distance between said opposite side portions, and a cantilevered cutting portion which is smaller than and integrally formed with said body and extends outwardly from one of said end portions for a distance which is less than the distance between said opposite end portions, said cutting portion having a face surface intersecting said body at a location between said opposite side portions and a pair of side surfaces which intersect said face surface at a pair of opposite corners which extend outwardly away from said body to an outer end of said cutting portion, a first one of said corners being disposed adjacent to said top surface and first side portion of said body, a second one of said corners being disposed adjacent to said bottom surface and a second side portion of said body, said face surface being skewed relative to said top and bottom surfaces of said body in such a manner that said first corner is spaced further from the bottom surface of said body than said second corner and said second corner is spaced further from the top surface of said body than said first corner.

43. A device as set forth in claim 42 wherein said one end portion of said body includes an end surface and a chip deflecting surface which slopes away from said end surface toward a second one of said end portions to an intersection with said top surface, said chip deflecting surface extending at an acute angle to said top surface and to said end surface.

44. A device as set forth in claim 42 wherein said cantilevered cutting portion has a pair of bottom surfaces which extend transversely to each other, to said face surface and to said side surfaces.

45. A device as set forth in claim 44 wherein one of said pair of bottom surfaces on said cantilevered cutting portion is disposed in a coplanar relationship with the bottom surface of said body, the other bottom surface of said pair of bottom surfaces being disposed in a plane which is coplanar with the flat surface area of said first one of said side portions.

46. A device for holding an insert which cuts material from within an opening formed in a workpiece, said device comprising a longitudinally extending shank having inner and outer end portions, said outer end portion of said shank including surface means for defining a recess having a main section to receive the insert and an extension section to receive at least a portion of a fastener which is effective to hold the insert against movement relative to said shank, said surface means including a flat planar bottom surface area which at least partially defines the bottom of the main and extension sections of said recess and is adapted to abuttingly engage a bottom surface of the insert, a first flat planar side surface area which extends transversely to said flat planar bottom surface area and is adapted to abuttingly engage a side surface of the insert, a second flat planar side surface area which extends transversely to said flat planar bottom surface area and parallel to said first side surface area, a third flat planar side surface area which extends transversely to said flat planar bottom surface area and parallel to said first side surface area, said third side surface area being coplanar with said second side surface area and being spaced apart from said second side surface area, said first side surface area being disposed adjacent to one edge portion of said bottom surface area and said second and third side surface areas being disposed adjacent to an edge portion of said bottom surface area which is opposite from said one edge portion, said surface means further including a fourth side surface area which at least partially defines said extension section of said recess, said fourth side surface area including a first portion which is connected with one end portion of said second side surface area, a second portion which is spaced apart from said first portion and is connected with one end portion of said third side surface area, and an arcuate third portion interconnecting said first and second portions, said bottom surface area sloping away from said extension portion of said recess toward said first side surface area in a direction away from said inner end portion of said shank.

47. A device as set forth in claim 46 wherein said shank has a longitudinally extending central axis which intersects a flat plane containing the bottom surface area at an acute angle at a location which is intermediate a plane containing said first side surface area and a plane containing said second and third side surface areas.

48. A device as set forth in claim 46 wherein said shank has a pair of arcuate outer side surfaces, said arcuate outer side surfaces of said shank having spaced apart centers of curvature which are offset from a longitudinal central axis of said shank, said main section of said recess having a first open end portion which is disposed in a plane containing a first one of the arcuate outer side surfaces of said shank, said main section of said recess having a second open end portion which is disposed in a plane containing a second one of the arcuate outer side surfaces of said shank.

* * * * *

UNITED STATES PATENT AND TRADEMARK OFFICE
CERTIFICATE OF CORRECTION

PATENT NO. : 4,102,591
DATED : July 25, 1978
INVENTOR(S) : Arnold B. Alcorn

It is certified that error appears in the above-identified patent and that said Letters Patent are hereby corrected as shown below:

Column 10, line 66 change "concident" to --coincident--.

Column 14, line 54 change "surface" to --surfaces--.

Column 15, line 1 change "corner" to --corners--.

Signed and Sealed this

Twenty-fourth Day of April 1979

[SEAL]

Attest:

RUTH C. MASON
Attesting Officer

DONALD W. BANNER
Commissioner of Patents and Trademarks